US009138695B2

(12) United States Patent
Chen

(10) Patent No.: US 9,138,695 B2
(45) Date of Patent: Sep. 22, 2015

(54) METHOD OF MAKING HIGH-OXYGENATED WATER AND THE APPARATUS OF MAKING THE SAME

(71) Applicant: Chien-An Chen, Kaohsiung (TW)

(72) Inventor: Chien-An Chen, Kaohsiung (TW)

( * ) Notice: Subject to any disclaimer, the term of this patent is extended or adjusted under 35 U.S.C. 154(b) by 440 days.

(21) Appl. No.: 13/673,614

(22) Filed: Nov. 9, 2012

(65) Prior Publication Data

US 2014/0134296 A1 May 15, 2014

(51) Int. Cl.
*A23L 2/54* (2006.01)
*B01F 3/04* (2006.01)

(52) U.S. Cl.
CPC ......... *B01F 3/04808* (2013.01); *B01F 3/04482* (2013.01); *B01F 2003/04879* (2013.01)

(58) Field of Classification Search
CPC ............. B01F 3/04836; B01F 3/04843; B01F 2003/04879; B01F 2003/04524; B01F 2003/0446; B01F 2003/04503; B01F 2003/04468; B01F 2003/04808
USPC ............................................. 426/66, 67, 474
See application file for complete search history.

(56) References Cited

U.S. PATENT DOCUMENTS 5,814,222 A * 9/1998 Zelenak et al. ............... 210/615

* cited by examiner

*Primary Examiner* — Helen F Heggestad
(74) *Attorney, Agent, or Firm* — Ming Chow; Sinorica, LLC

(57) ABSTRACT

An apparatus for making high-oxygenated water includes an oxygen supply, an exchange tank, and a pressure tank. The oxygen supply respectively supplies pure oxygen to the exchange tank and the pressure tank. The pure oxygen is dissolved in water in the exchange tank in a normal pressure environment to obtain oxygenated water. A slow-down unit is provided in the exchange tank to extend the time of the pure oxygen staying in the exchange to raise the dissolved oxygen of the oxygenated water. Next, the oxygenated water is drained to the pressure tank, and then the pure oxygen is dissolved in the oxygenated water in the exchange tank in a high pressure environment to obtain high-oxygenated water.

14 Claims, 6 Drawing Sheets

METHOD OF MAKING HIGH-OXYGENATED WATER AND THE APPARATUS OF MAKING THE SAME

BACKGROUND OF THE INVENTION

1. Field of the Invention

The present invention relates generally to oxygenated water, particularly to a method and an apparatus of making high-oxygenated water.

2. Description of the Related Art

Water is the basic element of life. Good water is helpful to metabolism. The high-oxygenated water sold in the market is simply made by dissolving oxygen in water. Oxygen will go into body when one drinks such water and be directly absorbed by tissue that may have a growth stimulatory effect on normal cells and keep you away from illnesses.

A conventional method of making high-oxygenated water is compressing pure oxygen in water and wait for oxygen dissolution process. At the same time, some gases (such as nitrogen and carbon dioxide) which are already dissolved in the water will escape and mix in the pure oxygen. Therefore, operator has to exhaust all the gas out, pump new pure oxygen in, and wait for oxygen dissolution process. It has to repeat above steps for several times to obtain the high-oxygenated water.

In the conventional method of making high-oxygenated water, the usage rate of oxygen is very low (only about 10%) so that the manufacture has to provide a huge oxygen tank to reduce the repeating times for dissolving oxygen. However, it is afforded for a mass production, and not for personal use. Besides, it takes a long time to wait for oxygen dissolution process and is not efficient enough.

SUMMARY OF THE INVENTION

The primary objective of the present invention is to provide a method and an apparatus of making high-oxygenated water, which has a high usage rate of oxygen and a short time of manufacture.

According to the objective of the present invention, an apparatus of making high-oxygenated water includes an oxygen supply, an exchange tank, and a pressure tank. The oxygen supply respectively supplies the exchange tank and the pressure tank with pure oxygen. The pure oxygen is dissolved in water in the exchange tank in a normal pressure environment to obtain oxygenated water. The oxygenated water is drained to the pressure tank, and then the pure oxygen is dissolved in the oxygenated water in the exchange tank in a high pressure environment to obtain high-oxygenated water.

In an embodiment, the exchange tank has a first water inlet and an air outlet at a top thereof and a first water outlet and a first air inlet at a bottom thereof. The pressure tank has a second water inlet at a top thereof and a second water outlet and a second air inlet at a bottom thereof. The oxygen supply respectively connects to the first air inlet of the exchange tank and the second air inlet of the pressure tank. The first water outlet of the exchange tank connects to the second water inlet of the pressure tank.

A method of making high-oxygenated water includes the following steps:

a) Supply an exchange tank with water via a top of the exchange tank.

b) Supply the exchange tank with pure oxygen via a bottom of the exchange tank for dissolving the pure oxygen in the water in a normal pressure environment to obtain oxygenated water.

c) Drain the oxygenated water to a pressure tank; and d) Supply the pressure tank with pure oxygen via a bottom of the pressure tank for dissolving the pure oxygen in the oxygenated water in a high pressure environment to obtain high-oxygenated water.

Therefore, it will speed up the oxygen dissolution process and raise the dissolved oxygen in the high pressure environment.

DETAILED DESCRIPTION OF THE INVENTION

Figure 1:
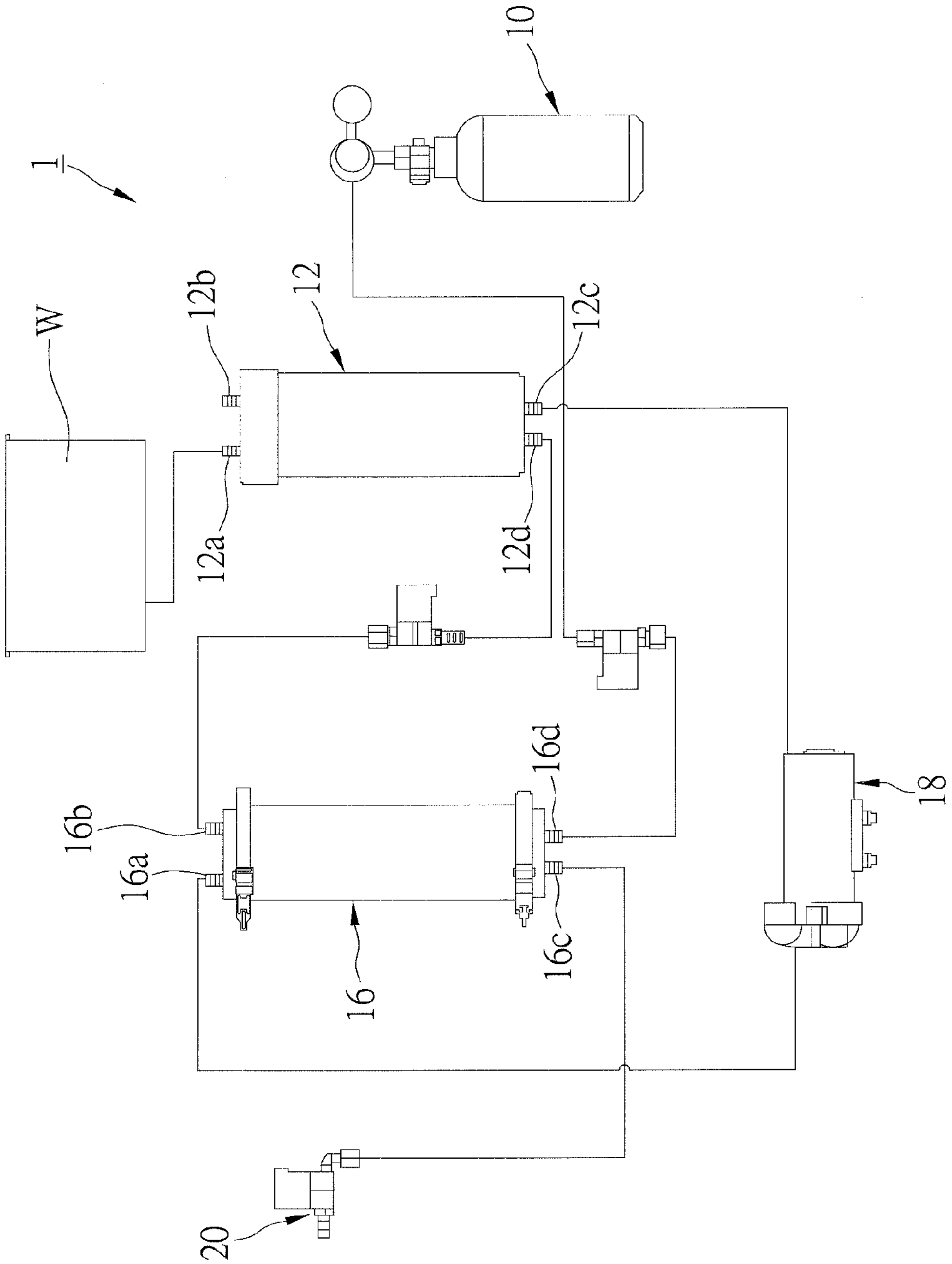
FIG. 1 is a sketch diagram of the apparatus of making high-oxygenated water of a first preferred embodiment of the present invention.

As shown in FIG. 1, an apparatus of making high-oxygenated water of the first preferred embodiment of the present invention includes an oxygen supply, a first oxygen dissolving device, a second oxygen dissolving device, and a compressor.

The oxygen supply is an oxygen cylinder 10 to supply pure oxygen.

The first oxygen dissolving device includes an exchange tank 12 and a slow-down unit.

The exchange tank 12 has a first water inlet 12*a* and an air outlet 12*b* at a top thereof, and has a first water outlet 12*c* and a first air inlet 12*d* at a bottom thereof. A water source W is connected to the first water inlet 12*a* to supply the exchange tank 12 water. The oxygen cylinder 10 is connected to the first air inlet 12*d* to supply the exchange tank 12 with pure oxygen.

Figure 2:
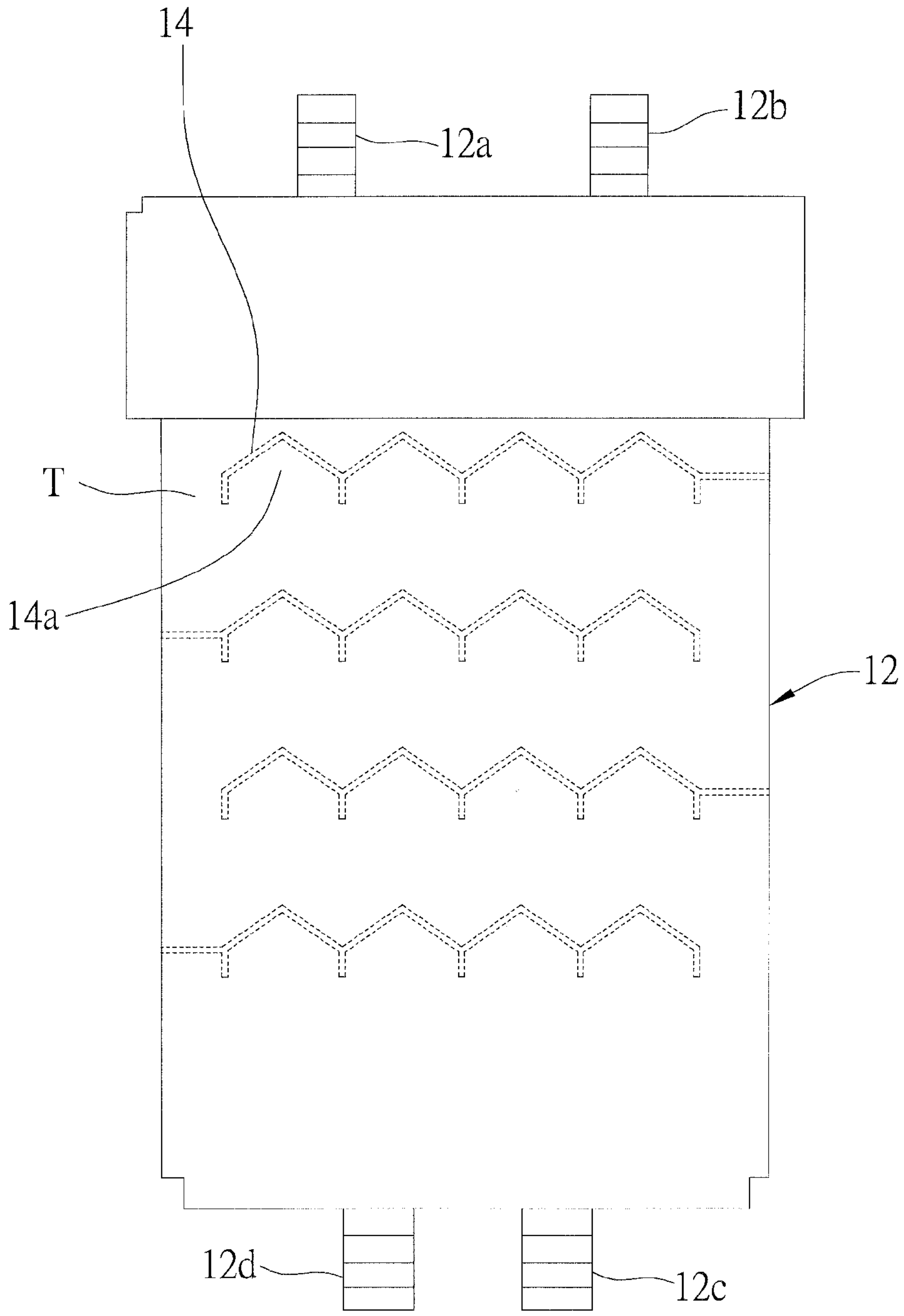
FIG. 2 is a perspective view of the exchange tank of the first preferred embodiment of the present invention.
Figure 3:
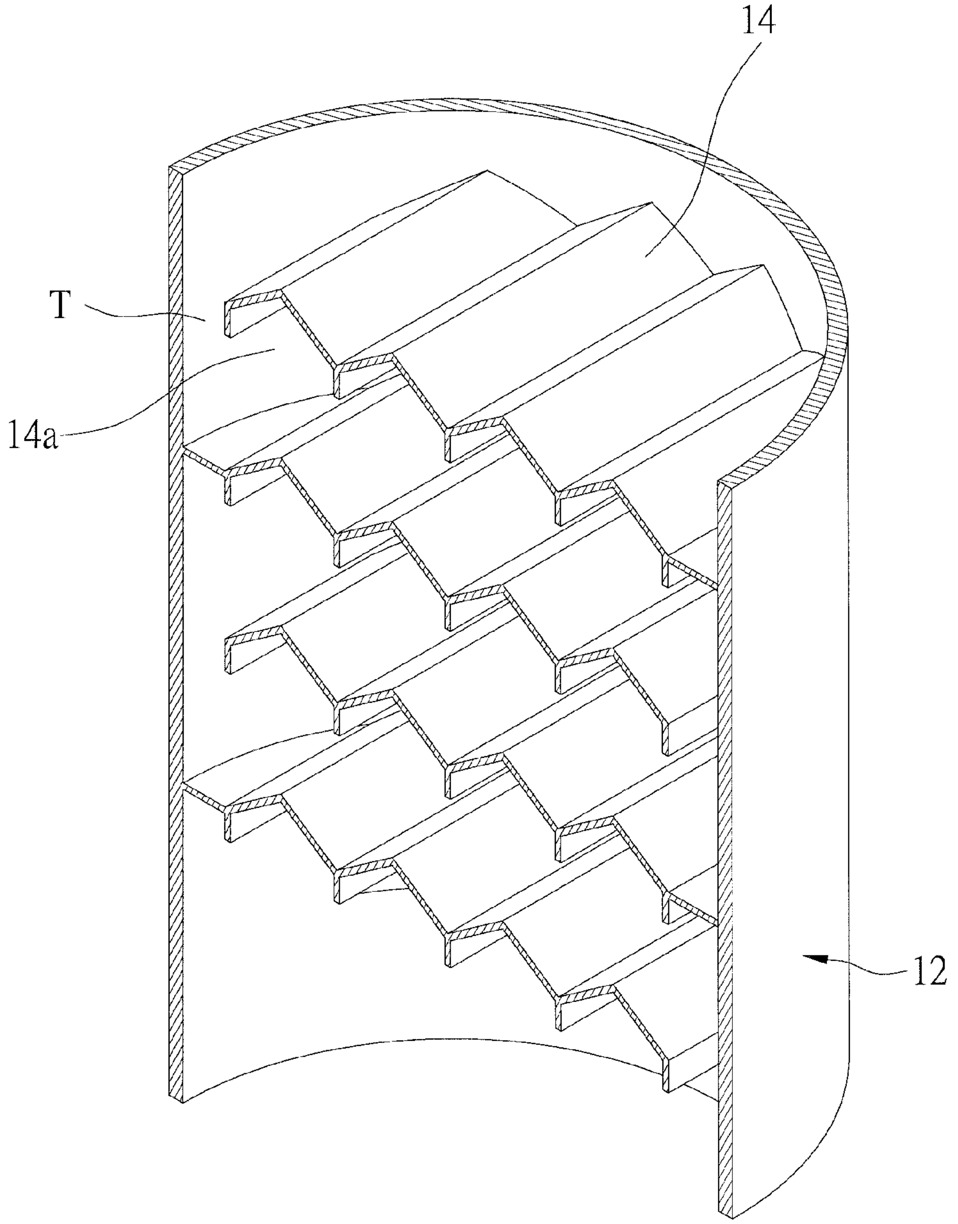
FIG. 3 is a sectional of the exchange tank of the first preferred embodiment of the present invention.

As shown in FIG. 2 and FIG. 3, the slow-down unit has a plurality of plates 14 received in the exchange tank 12 to elongate the time of the pure oxygen going from the first air inlet 12*c* to the air outlet 12*b*. The plates 14 are arranged in horizontal and parallel and has a distance therebetween. Each plate 14 is a continuous V-shaped member (or wave member), and has ribs at the turn portions so that exchange rooms 14*a* are formed between the neighboring ribs. Each plate 14 has an end connected to the exchange tank 12. A length of each plate 14 is shorter than a diameter of the exchange tank 12 so that a passage is formed between a distal end of each plate 14 and the exchange tank 12. The neighboring plates 14 have opposite ends connected to the exchange tank 12 so that a continuous S passageway T is formed in the exchange tank 12. The plates 14 provide a long distance for the oxygen going from the first air inlet 12*c* to the air outlet 12*b* so that the oxygen stays in the exchange tank 12 longer.

The second oxygen dissolving device includes a pressure tank 16. The pressure tank 16 has a second water inlet 16*a* and an air outlet 16*b* at a top thereof, and has a second water outlet 16*c* and a second air inlet 16*d* at a bottom thereof. The second water inlet 16*a* is connected to the first water outlet 12*c* of the exchange tank 12 through a hose. The compressor has a motor 18 to drain the oxygenated water in the exchange tank 12 to the pressure tank 16 through the hose. The oxygen cylinder 10 is connected to the second air inlet 16*d* to supply the pressure tank 16 with pure oxygen and create a high pressure environment in the pressure tank 16. In the pressure tank 16 the oxygen will be dissolved in the oxygenated water again to increase the dissolved oxygen in the water. A faucet 20 is connected to the second water outlet 16*c* of the pressure tank 16.

Figure 4:
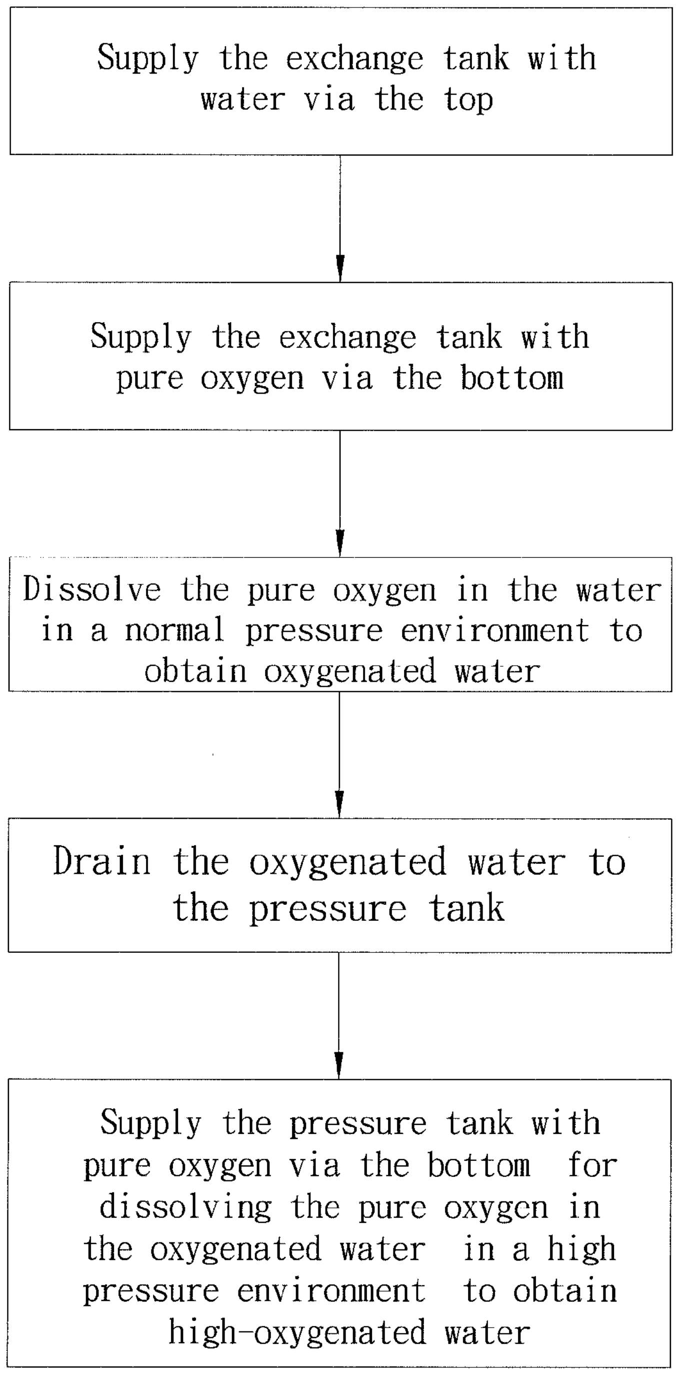
FIG. 4 is a flow chart of the method of making high-oxygenated water of the first preferred embodiment of the present invention.

FIG. 4 shows the flow chart of a method of making high-oxygenated water by the apparatus 1 as described above.

The water source W supplies the exchange tank 12 and the pressure tank 16 with water before the apparatus 1 is running. The preferable water is drinking water, such as water processed by reverse osmosis. When the apparatus 1 is running, water and pure oxygen are supplied to the apparatus 1 at the same time, or water first, or pure oxygen first.

The water source W supplies the exchange tank 12 with water through the first water inlet 12*a*. At the same time, oxygen cylinder 10 supplies the pressure tank 16 with pure oxygen through the second air inlet 16*d*, and then the pure oxygen go out of the pressure tank 16 via the air outlet 16*b* and go to the exchange tank 12 via the first air inlet 12*d*. Oxygen keeps going through the continuous S-shaped passageway in the exchange tank 12 and stays in the dissolving rooms 14*a* to be dissolved in the oxygenated water to obtain oxygenated water. The oxygenated water may come out of the exchange tank 12 through the first water outlet 12*c*.

The undissolved oxygen and other gases, which are already dissolved in the water, including nitrogen, carbon dioxide and hydrogen, will go out of the exchange tank 12 through the air outlet 12*b*. Therefore, the pressure in the exchange tank 12 is about one atmosphere (1 atm), and the dissolved oxygen of the oxygenated water coming out of the first water outlet 12*c* is about 9.07 ppm.

Next, the motor 18 drains the oxygenated water coming out of the exchange tank 12 through the first water outlet 12*c*, and then sends it to the pressure tank 16 via the second water inlet 16*a*. Oxygen in the pressure tank 16 is dissolved in the oxygenated water in a high pressure environment (about 11 atms) so that oxygen is dissolved into the oxygenated water continuously. Therefore, the dissolved oxygen of the water coming out of the faucet 20 will be 99.77 ppm, and that is high-oxygenated water.

It is noted that the gas coming out of the air outlet 12*b* of the exchange tank 12 may be provided to the water source W while the water in the water source W is drinking water. Therefore, the water supplied to the exchange tank 12 to the pressure tank 16 already has dissolved oxygen.

The advantages of the present invention include:

1. Water enters the tanks 12, 16 from the tops thereof, and oxygen enters the tanks 12, 16 from the bottoms thereof so that it may be shorten the time for oxygen dissolution process to obtain high-oxygenated water.

2. Before the oxygen escape, it goes through the pressure tank 16 and the exchange tank 12 in sequence to be dissolved in water. The usage rate of oxygen will be over 90% in the present invention.

3. Because of the high usage rate of oxygen the apparatus 1 of the present invention may be small enough to be operated in an ordinary house.

4. The slow slow-down unit in the exchange tank 12 is helpful to the oxygen dissolution process because it provide the oxygen contacting with water for a long time that may obtain higher dissolved oxygen.

Figure 5:
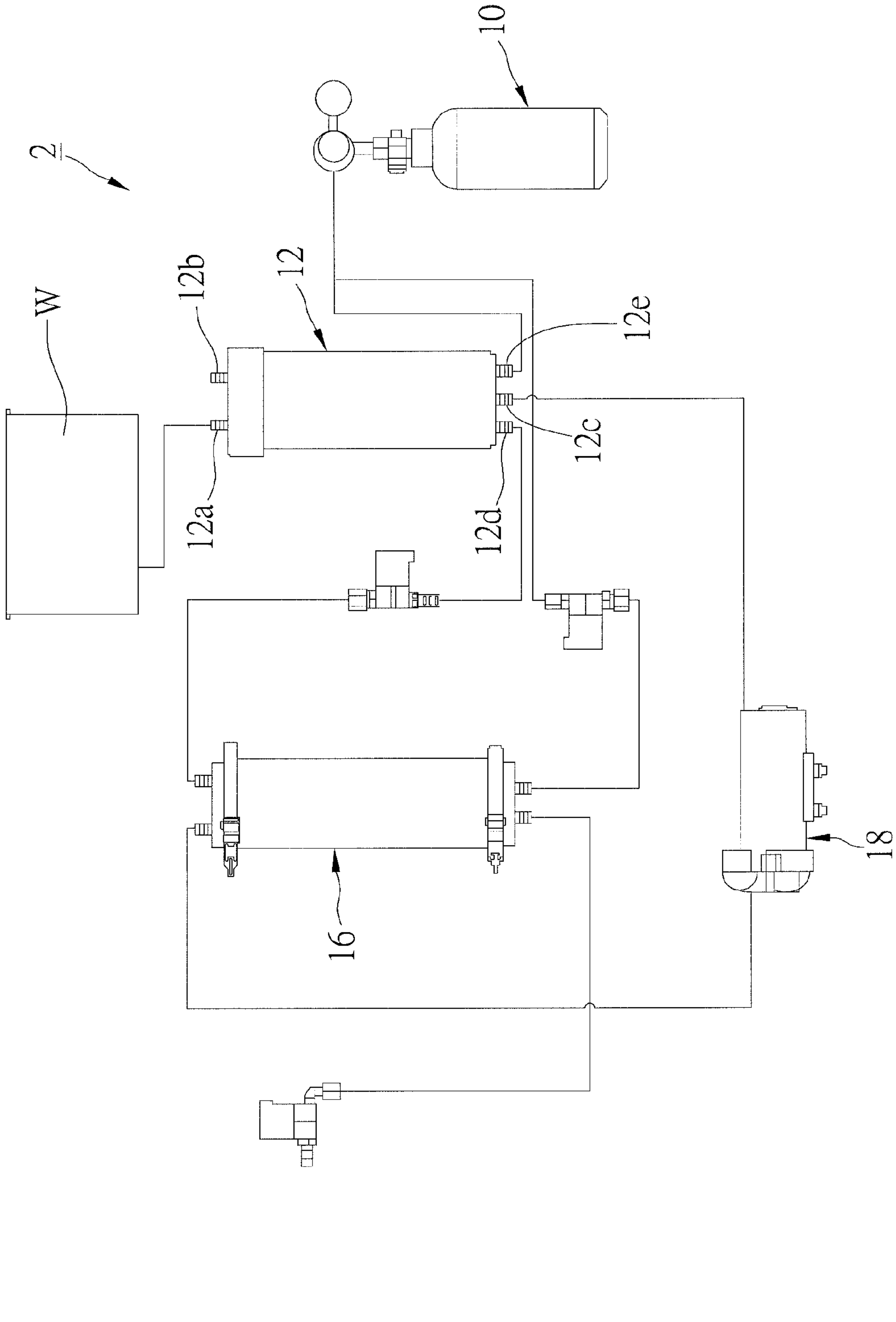
FIG. 5 is a sketch diagram of the apparatus of making high-oxygenated water of a second preferred embodiment of the present invention.

FIG. 5 shows another apparatus 2 of making high-oxygenated water of the second preferred embodiment, which is similar to the apparatus of the first preferred embodiment, except that the exchange tank 12 further has a third air inlet 12*e*. The third air inlet 12*e* is connected to the oxygen cylinder 10. Therefore, oxygen will be supplied to exchange tank 12 in two ways, directly from the oxygen cylinder 10; and through the pressure tank 16. It will have more oxygen in the exchange tank 12 to get more oxygen dissolved in the water.

Figure 6:
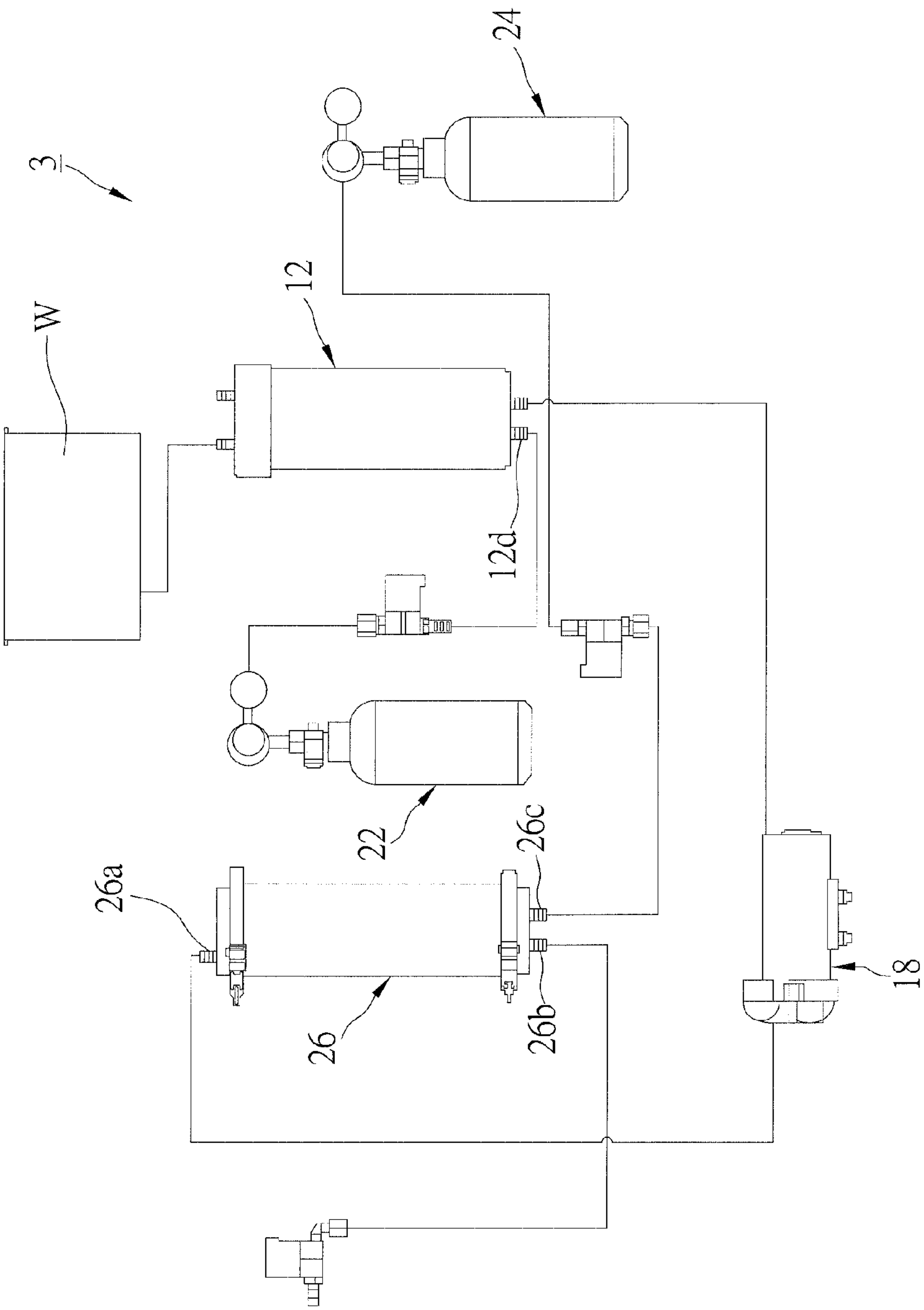
FIG. 6 is a sketch diagram of the apparatus of making high-oxygenated water of a third preferred embodiment of the present invention.

FIG. 6 shows another apparatus 3 of making high-oxygenated water of the third preferred embodiment, which is similar to the apparatus of the above two preferred embodiments, except that the oxygen supply has a first oxygen cylinder 22 and a second oxygen cylinder 24 respectively to supply the exchange tank 12 and the pressure tank 16 with oxygen. In this embodiment, the first oxygen cylinder 22 is connected to the first air inlet 12*d* of the exchange tank 12, and the second oxygen cylinder 24 is connected to the second air inlet 26*c* of the pressure tank 16. The pressure tank 16 has no second air outlet like the above embodiment. Two oxygen cylinders incorporated in the present embodiment may elongate the time of replacement for the new oxygen cylinders.

The description above is a few preferred embodiments of the present invention and the equivalence of the present invention is still in the scope of claim construction of the present invention.

What is claimed is:

1. An apparatus of making high-oxygenated water, comprising:

oxygen supplying means for supplying pure oxygen;

first oxygen dissolving means for dissolving the pure oxygen in water in a normal pressure environment to obtain oxygenated water; and second oxygen dissolving means for dissolving the pure oxygen in the oxygenated water in a high pressure environment to obtain high-oxygenated water;

wherein the first oxygen dissolving means includes an exchange tank having a first water inlet and an air outlet at a top thereof, and has a first water outlet and a first air inlet at a bottom thereof; a pressure tank has a second water inlet at a top thereof, and has a second water outlet and a second air inlet at a bottom thereof; the oxygen supply respectively connects to the first air inlet of the exchange tank and the second air inlet of the pressure tank; and the first water outlet of the exchange tank connects to the second water inlet of the pressure tank.

2. The apparatus as defined in claim 1, further comprising compressing means for draining the oxygenated water out of the exchange tank via the first water outlet and sending the oxygenated water to the pressure tank via the second water inlet.

3. The apparatus as defined in claim 2, wherein the compressing means includes a motor between the first water outlet of the exchange tank and the second water inlet of the pressure tank to drain the oxygenated water.

4. The apparatus as defined in claim 1, wherein the oxygen supplying means include a first oxygen cylinder connected to the first air inlet of the exchange tank and a second oxygen cylinder connected to the second air inlet of the pressure tank.

5. The apparatus as defined in claim 1, wherein the oxygen supplying means include an oxygen cylinder connected to the second air inlet of the pressure tank; the pressure tank further has an air outlet at the top thereof; and the air outlet of the pressure tank connects to the first air inlet of the exchange tank.

6. The apparatus as defined in claim 1, wherein the exchange tank further has a third air inlet at the bottom thereof; the pressure tank further has an air outlet at the top thereof; the air outlet of the pressure tank connects to the first air inlet of the exchange tank; and the oxygen supplying means include an oxygen cylinder respectively connected to the second air inlet of the pressure tank and the third air inlet of the pressure tank.

7. The apparatus as defined in claim 1, wherein the first oxygen dissolving means further include a slow-down unit in the exchange tank for extending a time of the pure oxygen going from the first air inlet to the air outlet.

8. The apparatus as defined in claim 7, wherein the slow-down unit has a plurality of plates in the exchange tank; and each of the plates has at least a dissolving room.

9. A method of making high-oxygenated water, comprising the steps of:

a) supplying an exchange tank with water via a top of the exchange tank, wherein the exchange tank has a first water inlet, which is for supplying water, and an air outlet at a top thereof, and has a first water outlet and a first air inlet a bottom thereof;

b) supplying the exchange tank with pure oxygen via the first air inlet at the bottom of the exchange tank for dissolving the pure oxygen in the water in a normal pressure environment to obtain oxygenated water;

c) draining the oxygenated water to a pressure tank, wherein the pressure tank has a second water inlet, which is for draining the oxygenated water, at a top thereof, and has a second water outlet and a second air inlet at a bottom thereof; and d) supplying the pressure tank with pure oxygen via the second air inlet at the bottom of the pressure tank for dissolving the pure oxygen in the oxygenated water in a high pressure environment to obtain high-oxygenated water;

wherein the first water outlet of the exchange tank connects to the second water inlet of the pressure tank.

10. The method as defined in claim 9, wherein the pure oxygen in the step b) and in the step d) comes from an oxygen supply.

11. The method as defined in claim 10, wherein the pure oxygen goes to the pressure tank and the oxygen tank in sequence.

12. The method as defined in claim 9, wherein the pure oxygen in the step b) comes from a first oxygen supply, and the pure oxygen in the step d) comes from a second oxygen supply.

13. The method as defined in claim 9, wherein the oxygenated water is drained to the pressure tank via the second water inlet at the top of the pressure tank by a motor in the step c).

14. The method as defined in claim 9, further comprising the step of extending a time of the oxygenated water staying in the exchange tank in the step b).

* * * * *